United States Patent [19]

Hamano

[11] Patent Number: 4,608,393
[45] Date of Patent: Aug. 26, 1986

[54] PROCESS FOR PRODUCING AN ION EXCHANGE MEMBRANE USING IRRADIATION BY IONIZING RADIATION FOLLOWED BY THERMAL POLYMERIZATION

[75] Inventor: Toshikatsu Hamano, Machida, Japan

[73] Assignee: Asahi Glass Company Ltd., Tokyo, Japan

[21] Appl. No.: 730,481

[22] Filed: May 6, 1985

[30] Foreign Application Priority Data

May 11, 1984 [JP] Japan .................................. 59-92925
May 11, 1984 [JP] Japan .................................. 59-92926

[51] Int. Cl.$^4$ ........................... C08D 5/20; C08F 8/00
[52] U.S. Cl. ....................................... 521/27; 521/28; 522/60; 522/124
[58] Field of Search .................... 521/28; 204/159.15; 521/27

[56] References Cited

U.S. PATENT DOCUMENTS 3,872,067 3/1975 Harris ................................. 526/293
4,196,065 4/1980 Gaussens et al. ............... 204/159.15
4,278,777 7/1981 Jakabhazy et al. .............. 204/59.15

FOREIGN PATENT DOCUMENTS 50-96476 7/1975 Japan .

OTHER PUBLICATIONS

Polymer Characterization—Adv. in Chem., ACS, Wash. D.C., pp. 476–484.

Primary Examiner—Joseph L. Schofer
Assistant Examiner—Peter F. Kulkosky
Attorney, Agent, or Firm—Oblon, Fisher, Spivak, McClelland & Maier

[57] ABSTRACT

A process for producing an ion exchange membrane comprising impregnating a base material with a polymerizable monomer material and polymerizing the monomer material, if necessary, followed by a reaction for introducing ion exchange groups, wherein said base material is made of an olefin polymer and/or a fluorinated olefin polymer, said polymerizable monomer material is a mixture comprising styrene, chloromethylstyrene and divinylbenzene as three essential components, and the polymerizable monomer material impregnated in the base material is firstly partially polymerized by irradiation of ionizing radiation, and subsequently completely polymerized by heating in the presence of a polymerization initiator.

2 Claims, No Drawings

PROCESS FOR PRODUCING AN ION EXCHANGE MEMBRANE USING IRRADIATION BY IONIZING RADIATION FOLLOWED BY THERMAL POLYMERIZATION

BACKGROUND OF THE INVENTION

1. Field of the Invention

The present invention relates to a process for producing an ion exchange membrane. More particularly, it relates to a novel process for producing an ion exchange membrane wherein a combination of a specific base material, a specific polymerizable monomer material and a specific polymerization method, is employed.

2. Description of the Prior Art

Ion exchange membranes such as cation exchange membranes having cation exchange groups such as sulfonic acid groups or carboxylic acid groups, or anion exchange membranes having anion exchange groups such as quaternary ammonium groups, are proposed to be used for a wide range of applications, for instance, as diaphragms for the electrolysis of various materials, as membranes for electrodialysis, as membranes for diffusion dialysis, as diaphragms for fuel cells or as membranes for treating various waste solutions. For an ion exchange membrane to be practically useful, it is generally desired that an ion exchange resin be supported in a form of a film on a base material primarily with a view to providing adequate mechanical strength. As a method for supporting an ion exchange resin in a form of a film on a base material, it is known to laminate a base material such as cloth on an ion exchange membrane, for instance, by lining or embedding the cloth on the ion exchange membrane by heat-pressing. Also, various proposals have been made on a method wherein a polymerizable monomer is impregnated as it is or, if required, after being partially polymerized, into the base material, and then polymerized, if necessary, followed by a reaction for introducing ion exchange groups.

In the process for producing an ion exchange membrane comprising impregnating base material with a polymerizable monomer and polymerizing the monomer, if necessary, followed by a reaction for introducing ion exchange groups, it is possible that, depending upon the type of the base material, the affinity between the base material and the ion exchange resin is poor, and consequently, the mechanical strength and electrochemical properties of the resulting ion exchange membrane are inadequate. Particularly when the base material is made of an olefin polymer such as polyethylene or polypropylene, or a fluorinated olefin polymer such as tetrafluoroethylene, trifluorochloroethylene or vinylidene fluoride, it is expected that an ion exchange membrane having excellent heat resistance and chemical resistance can be obtained. Nevertheless, in such a case, there will be the above-mentioned problem if the conventional method for polymerization is employed. With an aim to solve such a problem, it has been proposed to graft-polymerize the polymerizable monomer with the base material by using a method of irradiating ionizing radiation as the means for polymerization, as disclosed in Japanese Examined Patent Publications No. 30136/1982 and No. 14047/1984, and U.S. Pat. No. 4,414,090.

Styrene, chloromethylstyrene and divinylbenzene have been known as polymerizable monomers used for the production of ion exchange membranes. However, the present inventors have found that when such polymerizable monomers are used in combination with a base material made of an olefin polymer or a fluorinated olefin polymer, there will be the following problems.

As disclosed in the above-mentioned Japanese Examined Patent Publication No. 30136/1982, it is necessary to employ a method in which a specific polymer layer having a graft-polymerization degree of from 3 to 80% by weight is formed on a base material either by subjecting the base material to a certain pretreatment such as irradiation of ionizing radiation and then impregnating it with a specific monomer solution to be grafted, followed by polymerization, or by impregnating the base material with a specific monomer solution, followed by polymerization by the irradiation of ionizing radiation, and then an ion exchange resin is supported by means of this polymer layer.

On the other hand, according to Japanese Examined Patent Publications No. 8857/1981 and No. 34014/1981 based on a discovery of a peculiar phenomenon of polypropylene in connection with the radiation graft polymerization, it is required to employ a pre-irradiation method or short time low temperature co-existence irradiation method under specific conditions. Thus, in the production of a cation exchange membrane by using styrene and divinylbenzene or in the production of an anion exchange membrane by using chloromethylstyrene and divinylbenzene, it is hardly possible to obtain an ion exchange membrane having adequate mechanical strength either by the deterioration of the base material or the peeling of the film-forming layer

SUMMARY OF THE INVENTION

Thus, it has been found that an ion exchange membrane having adequate mechanical strength can readily and advantageously be obtained only when the three components are employed together as the essential components. Further, it has been found that the polymerization of the monomer mixture impregnated in the base material can effectively be conducted by firstly partially polymerizing the monomer mixture by irradiation of ionizing radiation, and then completely polymerizing it by heating in the presence of a polymerization initiator. The present invention has been accomplished based on these discoveries.

Namely, the present invention provides a process for producing an ion exchange membrane comprising impregnating a base material with a polymerizable monomer material and polymerizing the monomer material, if necessary, followed by a reaction for introducing ion exchange groups, wherein said base material is made of an olefin polymer and/or a fluorinated olefin polymer, said polymerizable monomer material is a mixture comprising styrene, chloromethylstyrene and divinylbenzene as three essential components, and the polymerizable monomer material impregnated in the base material is firstly partially polymerized by irradiation of ionizing radiation, and subsequently completely polymerized by heating in the presence of a polymerization initiator.

DETAILED DESCRIPTION OF THE INVENTION

In the present invention, it is important that the base material is impregnated with a mixture comprising the three components of styrene, chloromethylstyrene and divinylbenzene as essential components, followed by polymerization. Particularly, if either styrene or chloromethylstyrene is omitted, it becomes difficult to produce an ion exchange membrane wherein the formed polymer is firmly bonded to the base material. For instance, when a two component system of styrene and divinylbenzene is employed, there will be difficulties such that the base material and the film-forming resin layer are likely to readily detach from each other, or the film-forming resin layer itself is extremely brittle, and ruptures or fine cracks are likely to form.

In the present invention, the polymerizable monomer mixture to be impregnated in the base material, preferably comprises from 10 to 80% by weight of styrene, from 10 to 80% by weight of chloromethylstyrene and from 1 to 25% by weight of divinylbenzene. The preferred ranges of these proportions may vary to some extent depending upon the type of the desired ion exchange membrane. For instance, when a cation exchange membrane is intended, styrene is used in a large amount within the above range, whereas when an anion exchange membrane is intended, chloromethylstyrene is used in a large amount within the above range. In any case, if divinylbenzene is excessive, the electric resistance of the resulting ion exchange membrane tends to increase. On the other hand, if the amount is too small, it becomes difficult to attain an adequate mechanical strength. Usually, divinylbenzene is used in an amount as small as possible within the above range. Particularly, preferred is from 5 to 15% by weight of divinylbenzene. If chloromethylstyrene is excessive, the flexibility of the resin layer decreases, whereby cracks are likely to form. When an anion exchange membrane is desired, the resin layer is likely to swell and disintegrate. On the other hand, if a cation exchange mambrane is desired, the electric resistance tends to be too high. If the amount of chloromethylstyrene is too small, the bond between the base material and the resin layer is weak, and peeling is likely to occur. If an anion exchange membrane is desired, the electric resistance tends to be too high. If a cation exchange membrane is desired, the resin layer is likely to swell and disintegrate. Accordingly, chloromethylstyrene is preferably selected within the range of from 20 to 65% by weight. For the same reason as above, styrene is preferably selected within a range of from 20 to 65% by weight.

In the present invention, it is also important to use an olefin polymer and/or a fluorinated olefin polymer as a base material. By using such a base material, the obtained ion exchange membrane will have excellent heat resistance and chemical resistance. The base material may be in the form of a film so long as it is made of the above-mentioned material. However, it is usually preferred to employ it in the form of a woven fabric such as cloth or net, non-woven fabric or a thin film-like perforated base material such as a porous film. By using the polymerizable monomer mixture comprising the specific three components as essential components, the affinity to the base material or the reactivity is improved, and it is possible to obtain an ion exchange membrane wherein the base material and the polymer constituting a film-forming layer formed by the polymerization reaction, are firmly bonded to each other, although the reason is not necessarily clearly understood. The base material is employed usually in the form of a thin film having a thickness of from 5 to 500 $\mu$m, preferably from 20 to 300 $\mu$m. In the case of a porous base material, the porosity is preferably at most 90%, more preferably at most 80% primarily for the mechanical strength. The porosity here means (1 − apparent specific gravity of the base material ÷ true specific gravity of the base material) × 100 where the apparent specific gravity is a specific gravity in which the space occupied by the base material is taken into account, and the true specific gravity is a specific gravity of the material itself of the base material.

As the olefin polymer, there may be mentioned a homopolymer of an olefin such as ethylene, propylene, butene or methylpentene, a copolymer of such olefins, or a copolymer of such an olefin with another monomer. Specifically, there may be mentioned a high density polyethylene, a low density polyethylene or polypropylene. As the fluorinated olefin polymer, there may be mentioned various polymers or copolymers of tetrafluoroethylene, trifluorochloroethylene, vinylidene fluoride or hexafluoropropylene. Specifically, there may be mentioned a polytetrafluoroethylene, a polyvinylidene fluoride, an ethylene-tetrafluoroethylene copolymer, an ethylene-trifluorochloroethylene copolymer, a tetrafluoroethylene-hexafluoropropylene copolymer or a propylene-tetrafluoroethylene copolymer.

In the present invention, the above-mentioned specific base material is impregnated with a mixture of specific polymerizable monomers, followed by the polymerization of the monomer mixture. There is no particular restriction with respect to the polymerization conditions. However, usually, it is preferred to employ a polymerization condition under which a graft-polymerization with the base material will occur. For instance, a method may be employed in which the base material is preliminarily treated by irradiation of ionizing radiation, and it is possible to employ a simultaneous irradiation method in which the polymerization is conducted by irradiating ionizing radiation to a base material impregnated with the polymerizable monomer mixture. As mentioned above, in the present invention, the polymerizable monomer material impregnated in the base material, is firstly partially polymerized by the irradiation of ionizing radiation, and subsequently completely polymerized by heating in the presence of a polymerization initiator (i.e. without irradiation of ionizing radiation).

In the partial polymerization of the polymerizable monomer mixture by the irradiation of ionizing radiation such as $\gamma$-rays or electron beams, the conversion in the polymerization reaction is preferably adjusted to be at most 80%, preferably from 10 to 70%, particularly at least 30%. If the irradiation condition under which the conversion in the polymerization reaction at this stage is excessive, is employed, the base material itself tends to degrade by the ionizing radiation, and consequently it becomes difficult to obtain an ion exchange membrane having adequate mechanical strength. Then, the complete polymerization is conducted by heating in the presence of a polymerization initiator such as benzoyl peroxide without irradiation of ionizing radiation. In a uaual polymerization operation, the polymerizable monomer mixture containing a polymerization initiator is impregnated in the base material, then the first stage of the polymerization by the irradiation of ionizing radiation is conducted, and then the subsequent stage of the polymerization by heating will follow.

As the ionizing radiation, $\gamma$-rays from a Co-60 or Cs-172 ray source or electron beams from an electron beam accelerator, are preferably employed, and they are preferably applied at a radiation dose of from $10^2$ to $10^8$ rad/sec., preferably from $10^5$ to $10^7$ rad/sec. The radiation dose is selected so that the above-mentioned conversion in the polymerization reaction is obtained.

The irradiation temperature and the irradiation time are selected in the same manner. Usually, the irradiation is conducted at a temperature of not higher than 60° C., preferably from 10° to 40° C., for 0.5 to 48 hours, preferably from 1 to 20 hours, whereby the desired conversion in the polymerization reaction can be accomplished with a radiation dose of from 0.5 to 10 Mrad, preferably from 1.5 to 8 Mrad. Further, there is no particular restriction as to the conditions for the thermal polymerization of the subsequent stage. The thermal polymerization is conducted usually at a temperature of a level where the incorporated polymerization initiator is activated, and the thermal polymerization is continued until the remaining monomer mixture is completely polymerized. For instance, in the case where benzoyl peroxide is employed as the polymerization initiator, it is preferred to conduct the thermal polymerization at a temperature of from 60 to 150° C., preferably from 80° to 120° C., for from 0.5 to 12 hours. It is possible to lower the heating temperature or shorten the polymerization time by using a polymerization initiator which is active at a low temperature.

In the present invention, in addition to the above-mentioned three essential components, the polymerizable monomer mixture may further contain other polymerizable monomers, such as acrylic acid, methacrylic acid, hydroxyacrylate, hydroxymethacrylate, vinylpyridine, alkyl-substituted vinylpyridine, acrylonitrile, butadiene, isoprene, vinyltoluene and ethylvinylbenzene. Further, a suitable organic solvent such as tetrahydrofuran or benzene may be used to form a solution. Furthermore, it is possible to preliminarily partially polymerize the polymerizable monomer mixture or to incorporate polystyrene or nitrile-butadiene rubber, prior to impregnating the polymerizable monomer mixture into the base material.

For the polymerization of the polymerizable monomer mixture impregnated in the base material, it is advantageous in the present invention to conduct the polymerization in such a manner that the base material impregnated with the monomer mixture is sandwiched between e.g. polyester films, glass plates or aluminum foils which are inert to the polymerization reaction and capable of being removed after the completion of the polymerization reaction. For instance, it is preferred to conduct the above-mentioned first and subsequent polymerization steps with the base material impregnated with the polymerizable monomer mixture being sandwiched between polyester films such as polyethylene terephthalate films. Further, it is also possible to laminate a polyester film on the base material impregnated with the monomer mixture, then to roll the laminate so that the base material is located inside, and to polymerize the rolled laminate. When the thermal polymerization is conducted continuously following the first polymerization by the irradiation of ionizing radiation, the thermal polymerization may be conducted in warm water. Further, the impregnation of the base material with the polymerizable monomer mixture may effectively be conducted under reduced pressure.

In the present invention, when the monomer mixture is composed of the three essential components, the polymer formed by the polymerization of the monomer mixture impregnated in the base material, is subjected to a reaction for introducing ion exchange groups, to obtain an ion exchange membrane. It is also possible to incorporate an ion exchange group-containing compound into the polymerizable monomer mixture so as to obtain ion exchange membrane directly. Usually, cation exchange groups or anion exchange groups are introduced after the completion of the above-mentioned first and subsequent polymerization reactions by means of conventional methods, to obtain a desired ion exchange membrane. For instance, there may be mentioned a method wherein sulfonic acid-type cation exchange groups are introduced by using a sulfonating agent such as a concentrated sulfuric acid or chlorosulfonic acid, a method wherein quarternary ammonium-type anion exchange groups are introduced by aminating chloromethyl groups with a tertiary amine, or a method wherein a polymer membrane reactive for cyclization is subjected to a cyclization reaction by using $AlCl_3$ or $SnCl_4$ as the catalyst to form a cross-linked structure, then chloromethylated by an addition of $SnCl_4$ to chloromethyl ether, and converted to a quarternary amine to obtain an anion exchange membrane.

The ion exchange membranes obtainable by the process of the present invention are superior to conventional ion exchange membranes in the heat resistance and chemical resistance by the employment of the specific base material, and they have adequate mechanical strength with firm bonding of the film-forming layer and the base material, which is attained by the employment of the specific polymerizable monomer mixture and the specific polymerization method. It is of course possible to optionally adjust the electric characteristics such as the effective resistance, transport number or ion-exchange capacity. Accordingly, the ion exchange membranes of the present invention may be used for a wide range of purposes for which the conventional cation and anion exchange membranes have been proposed to be used. By virtue of the above-mentioned excellent properties and advantages, the utility may further expand. Specifically, there may be mentioned applications as diaphragms for fuel cells, diaphragms for various electrolyses, diaphragms for redox cells, membranes for the recovery and concentration of acids, membranes for the recovery and concentration of alkalis, membranes for electrodialysis at high temperatures, membranes for diffusion dialysis at high temperatures and membranes for double decomposition.

Now, the present invention will be described in further detail with reference to Examples. However, it should be understood that the present invention is by no means restricted by these specific Examples, and various additions or modifications are possible without departing from the object and spirit of the present invention. The proportions in the following Examples are by weight unless otherwise specifically indicated. The various physical properties of the ion exchange membranes were measured as follows:

Effective resistance: A membrane was disposed between cells of two compartment type; the two compartments were filled with a 0.5N NaCl solution, the resistance of the entire cells was measured by an alternate current bridge of 1000 c/s, then the membrane was removed, and the resistance of the solution only was measured. From the difference between two resistance values, the entire resistance R of the membrane was obtained, and the effective resistance Rm was obtained in accordance with the following equation.

$Rm = R \times S$ ($\Omega\text{-cm}^2$), where S is the surface area of the membrane.

Transport number: A membrane was disposed between cells of two compartment type; a 0.5N KCl solution and a 2.5N KCl solution were filled to the two compartments; the electromotive force between the two solutions was measured by means of calomel electrodes, and the transport number was calculated.

Strength (bursting strength): By a Müllen type bursting strength tester, pressure was exerted by means of a rubber film by using glycerol as the pressure medium and the maximum pressure at which the membrane ruptured, was measured.

EXAMPLE 1

A base material of polypropylene cloth (thickness: 112 μm; weight: 44.2 g/m$^2$) was impregnated with a mixture obtained by adding 2% of benzoyl peroxide to a syrup composed of 10% of divinylbenzene, 48% of styrene and 42% of chloromethylstyrene. The impregnated base material was sandwiched and secured by pair of polyester films and a pair of glass plates. Gamma-rays from cobalt-60 was irradiated at a dose of 3 Mrad at room temperature to carry out radiation polymerization, and then thermal polymerization was conducted for 6 hours in warm water at 90° C., to obtain a polymer membrane. This polymer membrane was subjected to sulfonating treatment in 98% concentrated sulfuric acid at 60° C. for 16 hours, to obtain a cation exchange membrane. The cation exchange membrane thereby obtained had an effective resistance of 4.43 Ω-cm$^2$, a thickness of 184 μm, a transport number of 85%, and a bursting strength of at least 5 kg/cm$^2$.

EXAMPLE 2

The same base material as used in Example 1 was impregnated with a mixture prepared by adding 2% of benzoyl peroxide to a syrup composed of 11% of divinylbenzene, 28% of styrene and 61% of chloromethylstyrene, and a polymer membrane was prepared in the same manner as in Example 1. This polymer membrane was subjected to amination treatment in 1N trimethylamine at 60° C. for 16 hours, to obtain an anion exchange membrane.

The anion exchange membrane thus obtained, had an effective resistance of 2.7 Ω-cm$^2$ a thickness of 168 μm, a transport number of 93%, and a bursting strength of at least 3 kg/cm2.

EXAMPLE 3

A base material of woven fabric made of an ethylene-tetrafluoroethylene copolymer (thickness: 145 μm; weight: 81.3 g/m$^2$) was impregnated with a mixture obtained by adding 2% of benzoyl peroxide to a syrup composed of 8% of divinylbenzene, 49% of styrene and 43% of chloromethylstyrene. The impregnated base material was sandwiched and secured by a pair of polyester films and a pair of glass plates. Gamma-rays from cobalt-60 were irradiated at a dose of 3 Mrad at room tempreature to carry out radiation polymerization, and then thermal polymerization was conducted in warm water at 90° C. for 6 hours, to obtain a polymer membrane. This polymer membrane was subjected to sulfonating treatment in 98% concentrated sufuric acid at 60° C. for 16 hours, to obtain a cation exchange membrane. The cation exchange membrane, had an effective resistance of 17 Ω-cm$^2$, a thickness of 152 μm, a transport number of 87%, and a bursting strength of at least 5 kg/cm$^2$.

EXAMPLE 4

The same base material as used in Example 3 was impregnated with a mixture obtained by adding 2% of benzoyl peroxide to a syrup composed of 11% of divinylbenzene, 28% of styrene and 61% of chloromethylstyrene, and a polymer membrane was prepared in the same manner as in Example 3. This polymer membrane was subjected to amination treatment in 1N trimethylamine at 60° C. for 16 hours, to obtain an anion exchange membrane.

The anion exchange membrane thereby obtained, had an effective resistance of 6.8 Ω-cm$^2$, a thickness of 174 μm, a transport number of 85%, and a bursting strength of at least 5 kg/cm$^2$.

COMPARATIVE EXAMPLE 1

The same polypropylene cloth base material as used in Example 1 was impregnated with a mixture obtained by adding 2% of benzoyl peroxide to a syrup composed of 8% of divinylbenzene and 92% of styrene. The impregnated base material was sandwiched and secured by a pair of polyester films and a pair of glass plates. Gamma-rays from cobalt-60 were irradiated at a dose of 3 Mrad at room temperature to carry out radiation polymerization, and then thermal polymerization was conducted in warm water at 90° C. for 6 hours, to obtain a polymer membrane. This polymer membrane was subjected to sulfonating treatment in 98% concentrated sulfuric acid at 60° C. for 16 hours, to obtain a cation exchange membrane. The cation exchange membrane thereby obtained remarkably swelled by absorption of water, and the size became about twice the polymer membrane and completely disintegrated.

COMPARATIVE EXAMPLE 2

The same polypropylene cloth base material as used in Example 1 was impregnated with a mixture obtained by adding 2% of benzoyl peroxide to a syrup composed of 8% of divinylbenzene and 92% of chloromethylstyrene. The impregnated base material was sandwiched and secured by a pair of polyester films and a pair of glass plates. Gamma-rays from cobalt-60 were irradiated at a dose of 3 Mrad at room temperature to carry out radiation polymerization, and then thermal polymerization was conducted in warm water at 90° C. for 6 hours, to obtain a polymer membrane. This polymer membrane was subjected to amination treatment in 1N trimethylamine at 60° C. for 16 hours, to obtain an anion exchange membrane. The anion exchange membrane thereby obtained, underwent a little dimensional change by absorption of water, but the resin layer peeled off completely from the base material, whereby it was not useful as an ion exchange membrane.

COMPARATIVE EXAMPLE 3

The same woven fabric of an ethylene-tetrafluoroethylene copolymer as used in Example 3, was impregnated with a mixture obtained by adding 2% of benzoyl peroxide to a syrup composed of 9% of divinylbenzene, 43% of styrene and 48% of chloromethylstyrene. The impregnated base material was secured in the same manner as in Example 3, and subjected to thermal polymerization in warm water at 90° C. for 12 hours, to obtain a polymer membrane. This polymer membrane was subjected to sulfonating treatment in 98% concentrated sulfuric acid in the same manner as in Example 3, to obtain a cation exchange membrane. Separately, the same polymer membrane was subjected to amination treatment in 1N trimethylamine in the same manner as in Example 4, to obtain an anion exchange membrane. While the polymer membrane looked like the same as the one obtained in Examples 3 and 4, but when it was converted to an ion exchange membrane by the introduction of ion exchange groups, the resin layer peeled off from the base material in each membrane.

COMPARATIVE EXAMPLE 4

The same woven fabric of an ethylene-tetrafluoroethylene copolymer as used in Example 3, was impregnated with the same syrup as in Comparative Example 3, and secured in the same manner as in Comparative Example 3. This membrane was irradiated with radiation from cobalt-60 until the polymerization completed (about 8 Mrad), to obtain a polymer membrane. The polymer membrane thereby obtained was brittle and disintegrated.

What is claimed is:

1. A process for producing an ion exchange membrane comprising impregnating a base material with a polymerizable monomer material and polymerizing the monomer material, if necessary, followed by a reaction for introducing ion exchange groups, wherein said base material is made of an olefin polymer and/or a fluorinated olefin polymer, said polymerizable monomer material is a mixture comprising styrene, chloromethylstyrene and divinylbenzene as three essential components, and the polymerizable monomer material impregnated in the base material is firstly partially polymerized to the extent of from 10 percent to 80 percent by irradiation with ionizing radiation, and subsequently is completely polymerized by heating in the presence of a polymerization initiator.

2. The process according to claim 1, wherein the polymerizable monomer material comprises from 10 to 80% by weight of styrene, from 10 to 80% by weight of chloromethylstyrene, and from 1 to 25% by weight of divinylbenzene.

* * * * *